Figure 1:
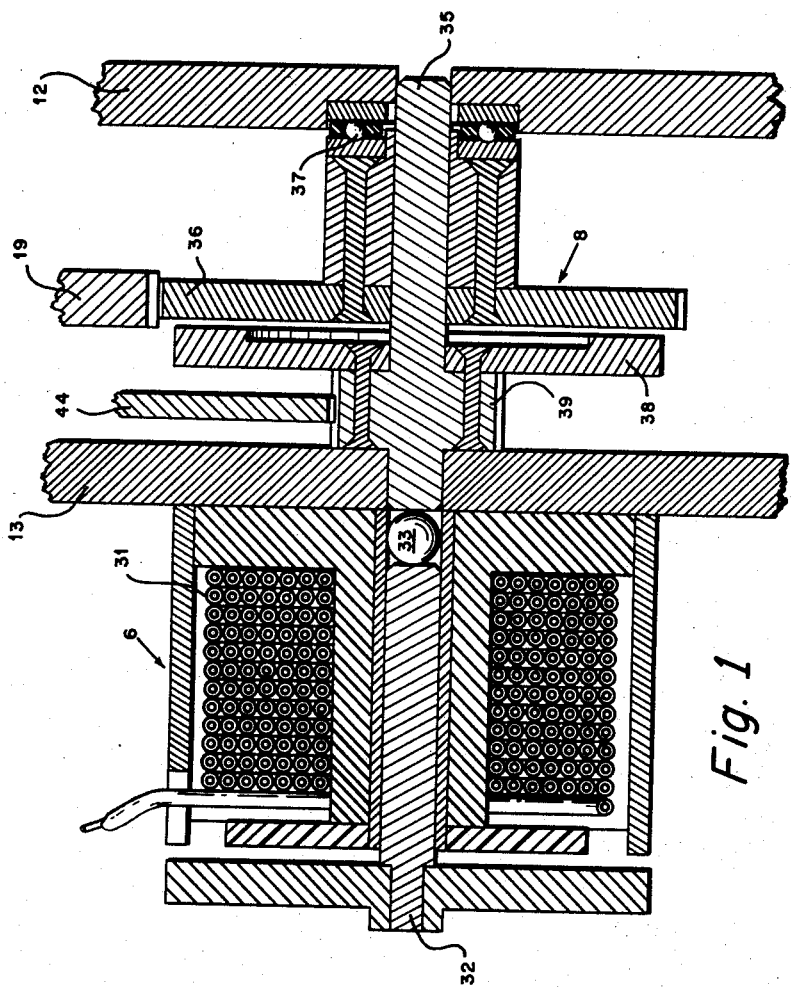

INVENTOR.
HOWARD B. JOPSON

AGENT

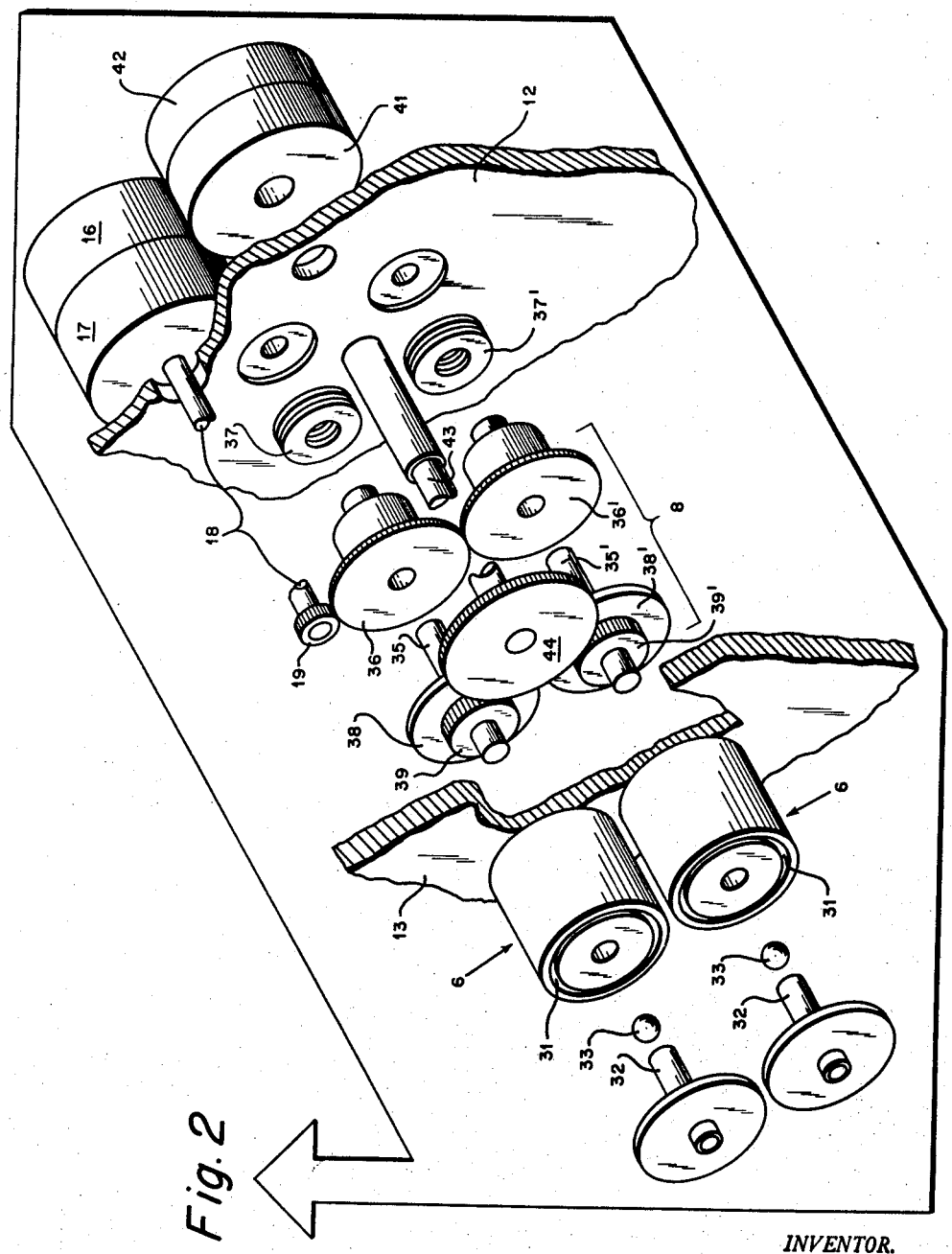

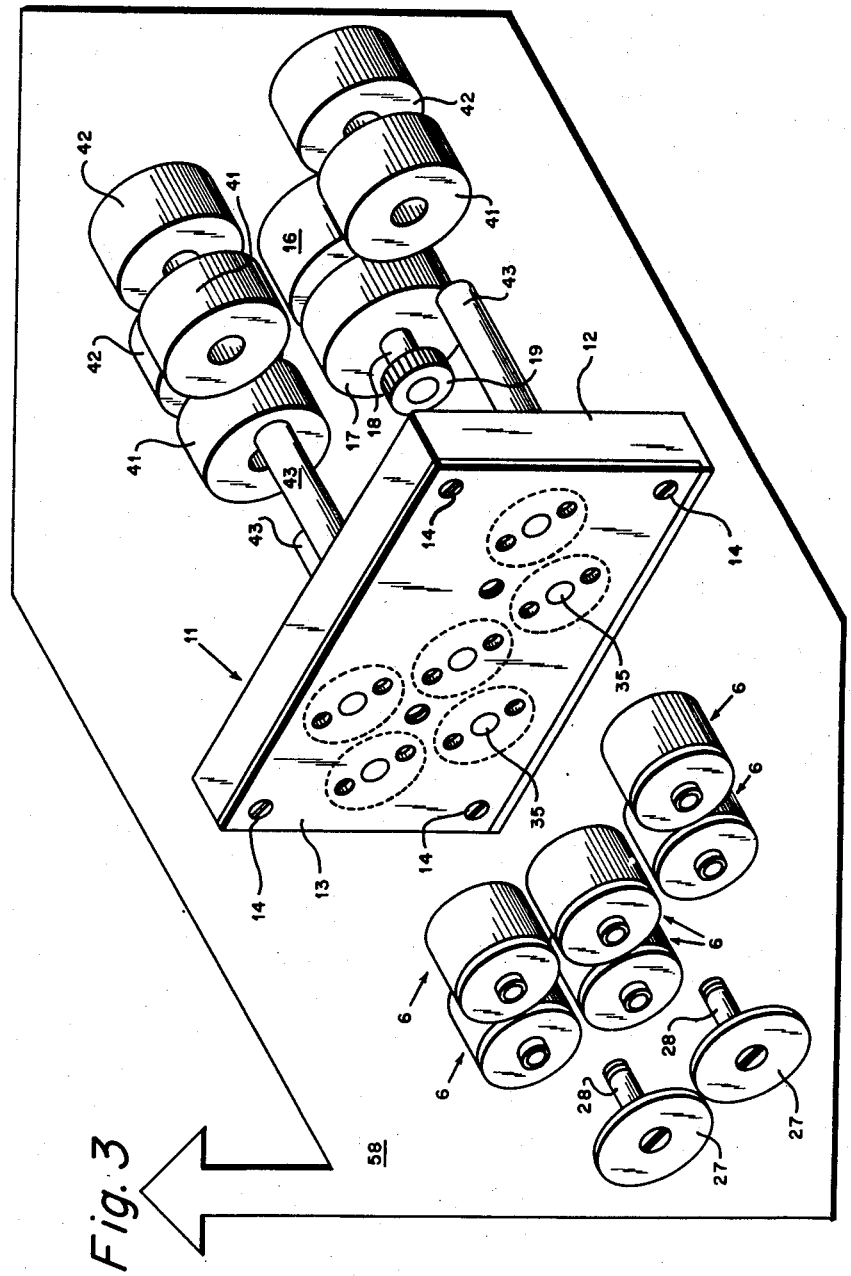

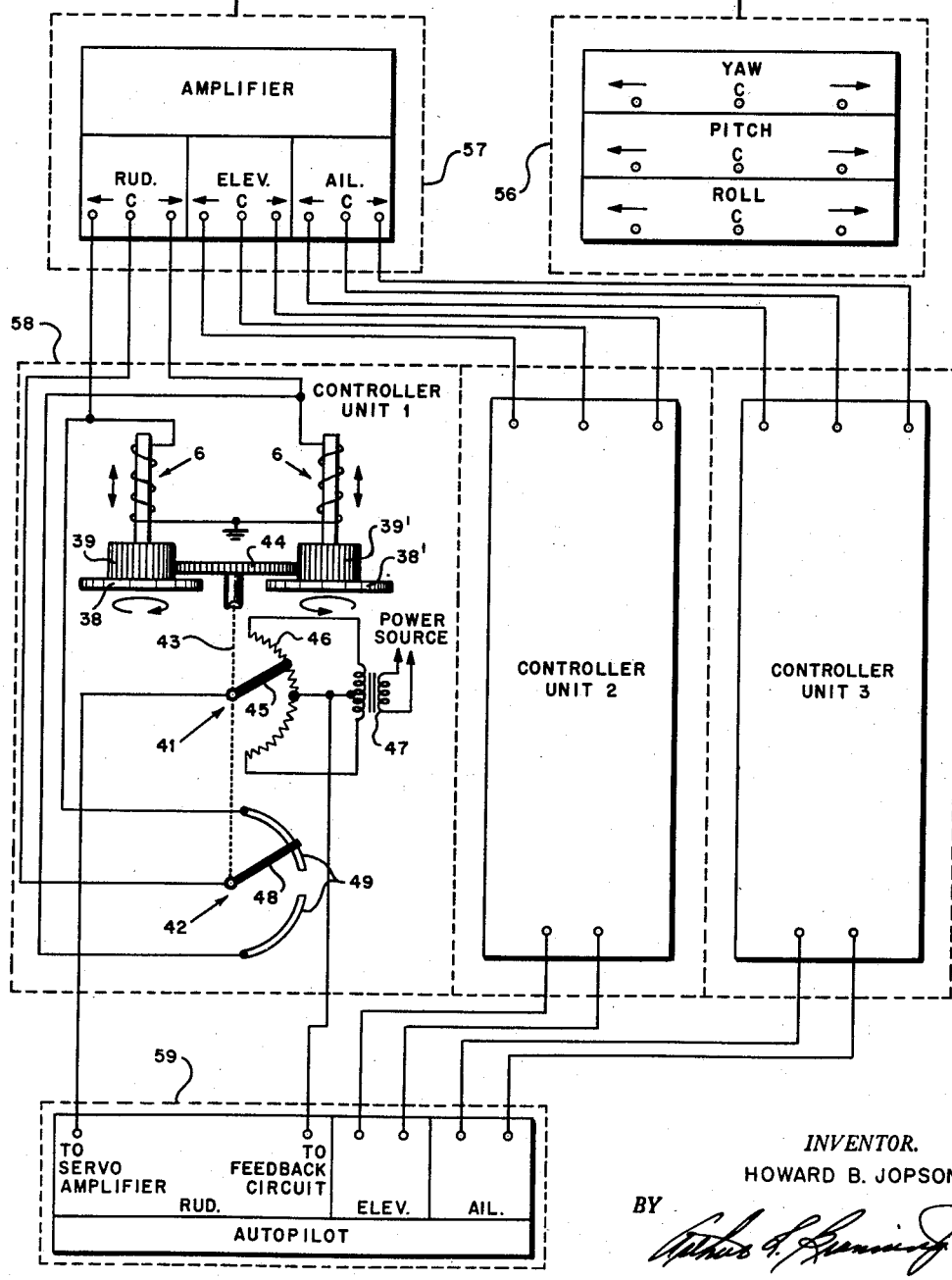

United States Patent Office 2,949,038
Patented Aug. 16, 1960

2,949,038

REVERSIBLE TRANSMISSION

Howard B. Jopson, Warrington, Pa., assignor to the United States of America as represented by the Secretary of the Navy Original application Nov. 2, 1953, Ser. No. 389,899, now Patent No. 2,894,236, dated July 7, 1959. Divided and this application June 5, 1958, Ser. No. 740,172

4 Claims. (Cl. 74—361)

(Granted under Title 35, U.S. Code (1952), sec. 266)

The invention described herein may be manufactured and used by or for the Government of the United States of America for governmental purposes without the payment of any royalties thereon or therefor.

This invention relates to a transmission mechanism and more particularly to a reversible, multiple clutch transmission mechanism including a continuously running unidirectional drive means and a plurality of paired clutches, especially suitable for use in a radio remote controller for aircraft.

This application is a division of copending application Serial No. 389,899, filed November 2, 1953, of Howard E. Jopson for a Radio Remote Controller for Aircraft, now Patent No. 2,894,236 dated July 7, 1959.

Known types of radio remote controllers currently used to regulate the autopilots in drone type aircraft include a plurality of reversible D.C. motors each of which is intermittently energized by suitable remote control means to displace a voltage biasing potentiometer mechanically connected to the motor. The efficiency of remote controllers of this type is seriously impaired by several very undesirable characteristics. They necessarily have a slow response time because of the time lag involved in first energizing a motor and then overcoming the inertia of numerous parts at rest before the potentiometer can be displaced by rotation of the motor to generate a biasing voltage. This is a very serious deficiency inasmuch as immediate response of the autopilot is frequently essential and always desirable for successful operation of drone aircraft. The second deficiency involves the characteristically broad limits of the centered positions of the voltage biasing potentiometer assembles incorporated in known types of controller units, which allow excessive latitude in returning the controller to the centered position for the purpose of returning the control surfaces of an aircraft to their respective neutral positions. This is also a serious deficiency since precise regulation of the position of the aircraft control surfaces is critical at all times during flight and particularly in operation of drone aircraft. Finally, D.C. motors have inherent characteristics which result in brush troubles at high altitudes. Consequently, the reliability of remote controllers making use of such motors is uncertain, especially where high altitude operations are involved.

The instant invention contemplates the use of a three output solenoid operated reversible clutch unit which is driven by a continuously running A.C. motor, in order to overcome the disadvantage of slow response time inherent in systems employing intermittently operated D.C. motors. Moreover, the use of a continuously running A.C. motor in the instant invention insures reliable operation over extended periods by eliminating the high altitude brush troubles inherent in D.C. motors.

An object of the present invention is the provision of an improved reversible transmission mechanism for a radio remote controller for aircraft autopilots capable of reliable operation over extended periods.

Another object of the invention is to provide a novel reversible multiple clutch transmission having a substantially accelerated rate of response to remote actuating signals.

A final object of this invention is to provide a continuously running drive means for a reversible multiple clutch mechanism selectively connected intermittently to a plurality of means for introducing voltage bias into an aircraft autopilot.

The exact nature of this invention as well as other object and advantages thereof will be readily apparent upon consideration of the following specification along with the annexed drawings in which:

Fig. 1 is a representative longitudinal cross section partly broken away showing one clutch unit within the reversible multiple clutch mechanism characterizing the instant invention, and the controlling solenoid associated therewith, Fig. 2 is a schematic exploded view partly broken away showing a representative pair of clutch units and their operating relation with the continuously running drive motor and with the potentiometer unit controlled thereby.

Fig. 3 is an exploded schematic representation of the entire reversible multiple clutch mechanism comprising the instant invention, and Fig. 4 is a diagrammatic representation of the entire reversible transmission mechanism incorporated in a radio remote controller for control of an aircraft.

Referring now to the drawings, wherein like reference numerals designate like or corresponding parts throughout the several views, there is shown in Fig. 1 a detailed view typical of the plurality of solenoid operated quick acting clutch units incorporated in the reversible transmission assembly characterizing the instant invention. The solenoid assembly 6 includes a winding 31 arranged to cause longitudinal movement of the armature 32 to the right, as seen in Fig. 1, whenever the winding 31 is energized. This movement of the armature 32 is transmitted to the clutch assembly 8 through the ball 33 and the clutch supporting shaft 35. The shaft 35 is arranged to support an input gear 36 and an adjacent thrust bearing 37, both of which are freely movable, both longitudinally and rotatably, relative to shaft 35. The shaft 35 also supports a clutch plate 38 and an adjacent gear 39, both of which are fixed, both longitudinally and rotatably, relative to shaft 35. Hence, longitudinal movement of the shaft 35 to the right as shown in Fig. 1 brings the clutch plate 38 into contact with the face of input gear 36, since gear 36 is restrained against movement to the right, as seen in Fig. 1, by the thrust bearing 37.

Since the input gear is continuously driven in one direction by a drive gear 19, engagement of the clutch plate 38 with the face of gear 36 produces immediate rotational movement of the clutch plate 38 and the attached gear 39 which is transmitted to a driven gear 44 continuously enmeshed with gear 39.

Solenoid operated quick acting clutch units of the type described above in relation to Fig. 1 may be arranged in pairs to form a reversisble transmission mechanism in the manner indicated in the simplified showing in Fig. 2. First and second clutch units are located on parallel axes so that the input gear 36 of the first clutch assembly 8 is enmeshed with input gear 36' of the second clutch assembly 8. With this arrangement, gears 36 and 36' are continuously driven in opposite directions by a single drive gear 19. The clutch plates 38 and 38' are of relatively reduced diameters, as indicated most clearly in Fig. 1, so that they are free to rotate in either direction simultaneously. The gears 39 and 39' of the respective clutch units are so disposed that they are both in continuous operable engagement with the same driven gear 44. Consequently, when neither solenoid is energized the driven gear 44 is motionless despite the fact that input gears 36 and 36' are rotating in opposite directions. When the solenoid of the first clutch unit is energized, the clutch plate 38 is moved into engagement with the input gear 36 and driven gear 44 is immediately rotated in the same direction as gear 36'. When the solenoid of the second clutch unit is energized, the clutch plate 38' is moved into engagement with the input gear 36' and driven gear 44 is immediately rotated in the same direction as gear 36. With both clutch assemblies 8 continuously enmeshed with the driven gear 44, only one of their associated solenoids should be energized at a time. Accordingly, the control circuits for the respective solenoids of the reversible clutch mechanism may be arranged so that energization of either solenoid interrupts the circuit by which the other solenoid is energized.

A plurality of such reversible clutch mechanisms may be combined to form a reversible transmission assembly 58, Fig. 3, for use with a single driving means. For example, three reversible clutch mechanisms each comprising a pair of clutch units arranged as shown in Fig. 2, may be grouped around a single drive gear 19 in the manner shown in Fig. 3 to provide a compact rapidly acting multiple clutch assembly with a single continuously operating driving means, particularly well adapted for use as an improved remote controller for an aircraft autopilot. The clutch housing assembly 11 includes the relatively flat rectangular clutch housing 12 and the flat clutch housing cover plate 13 attached thereto by suitable fastening means 14. The single driving mechanism includes a drive motor 16 connected through a gear train contained in the gear box 17 to a drive shaft 18 upon which drive gear 19 is fixedly secured. The gear box 17 and the drive motor 16 attached thereto are externally mounted centrally of the clutch housing 12 with the drive shaft 18 projecting through the housing to support the drive gear 19 within the clutch housing assembly 11. The three driven units controlled by the reversible multiple clutch mechanism of the instant invention such as potentiometer assemblies 41 and their respective associated centering switch assemblies 42 are mounted on the outer surface of the clutch housing 12 at spaced intervals around the driving mechanism. Each potentiometer has a conventional wiper arm, not shown, positioned angularly by a potentiometer shaft 43 projecting from the clutch housing 12. Since the driven gears 44, hereafter referred to as the potentiometer gears, are fixedly secured to the ends of the respective potentiometer shafts 43, as shown in Fig. 2, the continuous rotary motion of the drive gear 19 is selectively transmitted to one or more of the potentiometer shafts 43 through the respective clutch assemblies 8 in the manner described in detail above in relation to the showing in Fig. 2.

The six solenoid assemblies 6, grouped in pairs as indicated, are mounted upon the outer surface of the cover plate 13 by suitable fastening means not shown. The circular plates 27, secured fixedly to the cover plate 13 by threaded pins 28, are arranged to retain the armatures 32 within the respective solenoid assemblies 6.

Fig. 4 is a diagrammatic representation of a novel radio remote controller system for an aircraft autopilot incorporating the rapidly acting reversible multiple clutch transmission mechanism 58 which includes the entire showing in Fig. 3 corresponding to the three controller units 1, 2 and 3, illustrated in Fig. 4. Actuation of a selected keying means on the control panel 56 of the transmitter assembly, for example, the left hand directional button on the "yaw" portion of the control panel 56, results in transmission of a suitable signal to the receiver assembly 57 where it is amplified and directed through the corresponding "left" electrical circuit to one of the two solenoid assemblies in the controller unit 1 of the transmission assembly 58 which is arranged to control movements of the rudder of an aircraft. As noted above, in the description relative to Figs. 1 and 2, energization of the winding in the solenoid assembly 6 causes longitudinal movement of the armature thereof, to bring the clutch plate 38 into engagement with the face of an input gear 36, shown in Fig. 2. Rotation of the clutch plate 38 is transmitted through the gear 39 and the potentiometer gear 44 to the shaft 43. As the shaft 43 is rotated, the attached wiper arm 45 of the potentiometer 41 is moved angularly along the potentiometer resistance 46 away from a centered position in which the potentiometer produces a null signal. As the wiper arm 45 is moved, the electrical energy transmitted to the potentiometer 41 through the transformer 47 from a suitable power source produces a corresponding controlling signal for transmission to an autopilot assembly 59. The sense and magnitude of the signal thus produced is a function of the position of the wiper arm 45 upon the resistance 46.

In order to provide remotely controlled means for restoring each controller unit to a centered or neutral position after a signal has been imposed thereon in the manner described above, a centering switch 42 is mounted adjacent each potentiometer 41 with its angularly movable contact arm 48 attached to shaft 43 for movement coincident with that of the wiper arm 45. Thus, when the wiper arm 45 is displaced from a centered position by rotation of shaft 43 the contact arm 48 is likewise displaced so that it is brought into engagement with one of the peripheral contacts 49. When this condition exists, actuation of the centering button "c" on the "yaw" portion of the control panel, as shown in Fig. 4, energizes the circuit including the centering switch 42 and the solenoid assembly 6 which will move clutch plate 38' into engagement with the input gear 36' shown in Fig. 2 to produce reverse rotation of the shaft 43. When the contact arm 48 reaches its central position, the circuit through the centering switch is interrupted and hence the reverse rotation ceases with the wiper arm 45 in its centered position.

Actuation of the right hand directional button on the "yaw" portion of the control panel 56, followed by actuation of the centering button, produces a cycle of operation identical to that described above, except that the sequence in which the two solenoid assemblies 6 of controller unit 1 are energized is reversed, with the result that the potentiometer wiper arm 45 is initially moved angularly in the opposite direction and then reversed to return it to its centered position.

Since the components of the reversible multiple clutch mechanism 58 comprising the controller units 2 and 3 in Fig. 4 operate in exactly the same manner as the portion of the mechanism which comprises controller unit 1, the operation of which is described in detail above, their operation will not be described in detail.

Hence, the instant invention provides a compact and reliable reversible transmission mechanism for rapid and accurate control of aircraft autopilots particularly useful for the operation of drone type aircraft.

It should be understood, of course, that the foregoing disclosure relates particularly to a preferred embodiment of the invention and that numerous modifications and alterations may be made therein without departing from the spirit and scope of the invention as set forth in the appended claims.

What is claimed is:

1. A mechanism comprising, in combination, a relatively flat hollow housing having a first generally planar side wall and a second generally planar side wall parallel to said first side wall, a drive gear centrally disposed within said housing, a rotatable drive shaft carrying said drive gear and extending through said first side wall, a unidirectional continuously running drive motor mounted upon the outer surface of said first side wall and driving said drive shaft, a driven element mounted upon the outer surface of said first side wall, first and second axially shiftable clutch plate means mounted in said housing, a driven gear fixed to each said clutch plate means, a first input gear journaled in said housing coaxial with and having one side thereof adapted to be engaged by said first clutch plate means and driven by said drive gear, a second input gear enmeshed with and driven by said first input gear and coaxial with and having one side thereof adapted to be engaged by said second clutch plate means, an output gear enmeshed with said driven gears and adapted to drive said driven element in one direction when said first input gear is engaged with said first clutch plate means and in a reverse direction when said second input gear is engaged with said second clutch plate means, first and second solenoids mounted on the outer surface of said second side wall and each having individual actuating means projecting through said second side wall respectively fixed to said first and second clutch plate means.

2. A mechanism comprising, in combination, a drive gear, a rotatable drive shaft carrying said drive gear, a unidirectional continuously running drive motor driving said drive shaft, a driven element, first and second axially shiftable clutch plate means, a driven gear fixed to each said clutch plate means, a first input gear coaxial with and adapted to be engaged by said first clutch plate means and driven by said drive gear, a second input gear enmeshed with and driven by said first input gear and coaxial with and adapted to be engaged by said second clutch plate means, an output gear enmeshed with said driven gears and adapted to drive said driven element in one direction when said first input gear is engaged with said first clutch plate means and in a reverse direction when said second input gear is engaged with said second clutch plate means, first and second solenoids each having individual actuating means respectively fixed to said first and second clutch plate means, and said driven element bent driven in one direction when said first solenoid is energized and in the other direction when said second solenoid is energized.

3. A mechanism comprising, in combination, a drive gear adapted to be driven by a unidirectional continuously running drive motor, a housing, a plurality of axially shiftable clutch plate means, driven gear means fixed to each said clutch plate means, a first input gear journaled in said housing coaxial with and having one side thereof adapted to be engaged by one of said clutch plate means and driven by said drive gear, a second input gear enmeshing with and driven by said first input gear and coaxial with and having one side thereof adapted to be engaged by another one of said clutch plate means, a pair of solenoid means having actuating means fixed to said clutch plate means, and one of said clutch plate means being driven by said first input gear in one direction when one of said pair of solenoid means is energized and the other of said clutch plate means being driven in an opposite direction by said second input gear when the other of said pair of solenoid means is energized.

4. A mechanism comprising, in combination, a pair of parallel walls, an axially slidable clutch supporting shaft journaled in said parallel walls, a coaxial gear and a clutch plate fixed to said shaft between said parallel walls, an input gear journaled on said shaft between said parallel walls and adapted to be frictionally engaged by said clutch plate, thrust bearing means disposed between said input gear and one of said parallel walls, a continuously turning drive gear in mesh with and continuously turning said input gear, a driven gear in mesh with said coaxial gear fixed to said shaft, solenoid winding means fixed to one of said parallel walls, an axially slidable armature journaled in said solenoid winding means and coaxial with said shaft, a ball thrust bearing disposed between one end of said shaft and a juxtaposed end of said armature, means for selectively energizing said solenoid winding and causing said armature to slide towards said shaft and move the latter in the same axial direction until said clutch plate frictionally engages one side of said input gear and causing the movement of said input gear to be transmitted to said driven gear via said gear fixed to said shaft.

References Cited in the file of this patent

UNITED STATES PATENTS

| 2,386,402 | Lilja | Oct. 9, 1945 |
| 2,712,245 | Lee | July 5, 1955 |

UNITED STATES PATENT OFFICE

CERTIFICATION OF CORRECTION

Patent No. 2,949,038                                      August 16, 1960

Howard B. Jopson

It is hereby certified that error appears in the above numbered patent requiring correction and that the said Letters Patent should read as corrected below.

Column 5, line 37, for "bent" read -- being --.

Signed and sealed this 25th day of April 1961.

(SEAL)
Attest:

ERNEST W. SWIDER
Attesting Officer

DAVID L. LADD
Commissioner of Patents